United States Patent
Bordeaux

[15] 3,661,517
[45] May 9, 1972

[54] METHOD OF MANUFACTURE OF COPPER SULFATE CRYSTALS

[72] Inventor: Francis R. Bordeaux, 10604 Wheatland Ave., Sunland, Calif. 91040

[22] Filed: Nov. 10, 1969

[21] Appl. No.: 875,074

[52] U.S. Cl. .................................................. 23/125, 23/150
[51] Int. Cl. ....................................... C01g 3/10, C01b 31/20
[58] Field of Search ........................................... 23/125, 150

[56] References Cited

UNITED STATES PATENTS

| | | | |
|---|---|---|---|
| 1,350,239 | 8/1920 | Ross | 23/125 |
| 2,557,326 | 6/1951 | Tuwiner | 23/125 |
| 2,585,185 | 2/1952 | Supiro | 23/125 X |

OTHER PUBLICATIONS

Chemical Abstracts, Vol. 53, Page 7528
J. W. Mellor's; " A Comprehensive Treatise on Inorganic and Theoretical Chemistry," Vol. 3, 1923 Ed., pages 234 and 237, Longmans, Green & Co., New York.
H. Bennett's; " Concise Chemical and Technical Dictionary," Second Enlarged Ed., 1962, page 626, Chemical Pub. Co., Inc., New York.
M. C. Sneed et al., book " Comprehensive Inorganic Chemistry," Vol. 2, 1954, page 87, D. Van Nostrand Co., Inc., New York.

Primary Examiner—Edward Stern
Attorney—Robert E. Geauque

[57] ABSTRACT

A source of copper carbonate is obtained, such as by the treatment of a spent alkaline etchant solution with an acid, such as $H_2SO_4$. The resulting copper carbonate slurry is dried and put into a reactor. The exact amount of water to form $CuSO_4 \cdot 5H_2O$ is added to the reactor and then sulfuric acid is slowly added with agitation until the correct amount of $H_2SO_4$ is added to make $CuSO_4 \cdot 5H_2O$. The mixture is agitated while cooling and the resulting crystals are small and the yield is almost theoretical with no mother liquor remaining.

1 Claims, 1 Drawing Figure

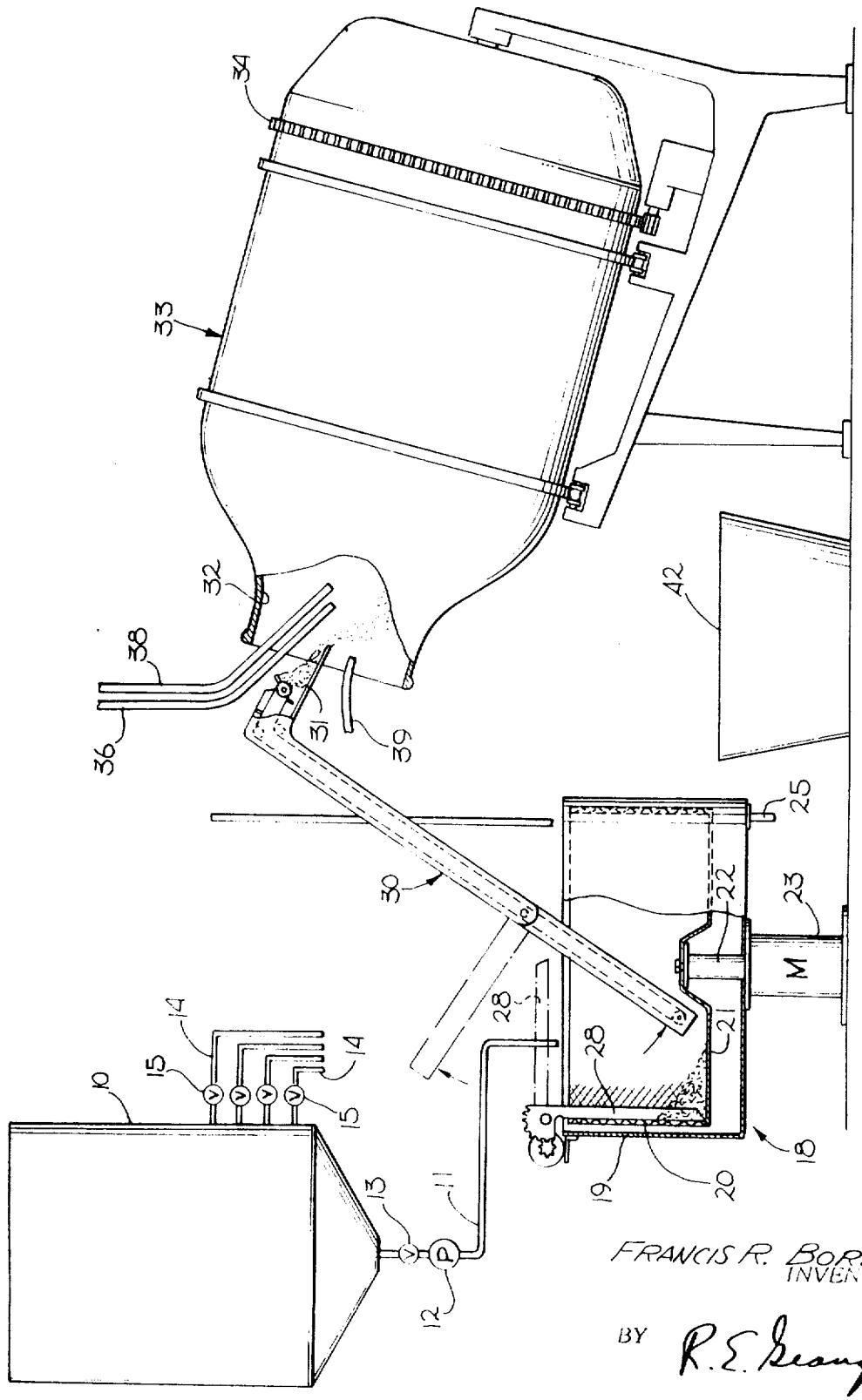

METHOD OF MANUFACTURE OF COPPER SULFATE CRYSTALS

BACKGROUND OF THE INVENTION

Presently there are a number of industrial uses for copper sulfate crystals. These crystals usually are produced by dissolving some form of copper, such as CuO, in sulfuric acid. The solution is concentrated by boiling and then allowed to cool and the crystals of $CuSO_4$ are allowed to grow, usually on strings, over a period of several days. The mother liquor is then drained off and recycled. Thereafter, the $CuSO_4$ crystals are washed with cold water and dissolved in boiling water and again allowed to grow. The final crystals are dried and packaged for shipment. The above process can be conducted at the location where the copper is mined in order to obtain a cheaper source of copper.

SUMMARY OF THE INVENTION

The present invention provides a simplified method for the manufacture of copper sulfate crystals and more particularly, a method of manufacture of fine copper sulfate pentahydrate crystals from alkaline solutions, such as those used in etching printed circuit boards. The spent alkaline etchant remaining after the etching of the board contains copper ions and this solution can be treated with any acid, such as $H_2SO_4$, to a pH of 6.4 to 6.8. This causes the formation of a slurry of copper carbonate ($CuCO_3$) which can be separated from the spent etchant. In accordance with the present invention, the copper carbonate slurry is dried and put into a reactor and the exact amount of water is added to form $CuSO_4 \cdot 5H_2O$. Thereafter, sulfuric acid is slowly added with agitation until the correct amount is added to produce $CuSO_4 \cdot 5H_2O$. The mixture is agitated while cooling and the formed crystals are relatively small. The yield resulting from the reaction is almost theoretical with no mother liquor remaining. The above process eliminates several steps and a great deal of time required in the production of copper sulfate by the growing of crystals.

It is therefore an object of the present invention to provide a simplified method of the manufacture of copper sulfate which comprises the addition of water to copper carbonate and then the addition of sulfuric acid to react with the copper carbonate and form copper sulfate crystals.

Another object of the invention is to provide a method of manufacture of copper sulfate comprising the addition to copper carbonate of substantially the amount of water required to form $CuSO_4 \cdot 5H_2O$ and then slowly adding sulfuric acid until the correct amount is added to produce $CuSO_4 \cdot 5H_2O$. The copper carbonate can be obtained in slurry form from a spent alkaline etchant and dried in a centrifuge before the addition of water thereto.

BRIEF DESCRIPTION OF THE DRAWINGS

The drawing is a schematic illustration of equipment for practicing the method of manufacture of copper sulfate in accordance with the invention.

DESCRIPTION OF THE PREFERRED EMBODIMENT

In one form of the invention, copper carbonate $CuCO_3$ is obtained in slurry form from spent alkaline etchant remaining after the etching of printed circuit boards. As illustrated in the drawing, the spent etchant solution is placed in fiberglass lined wooden tank 10 and diluted $H_2SO_4$, or other suitable acid, is added to neutralize the alkaline solution to a pH of about 6.4 to 6.8 and cause precipitating of copper carbonate in slurry form. The $CuCO_3$ is formed by the reaction of $NH_4H_3CO_3$ in the original etch solution with the copper ions removed by the etchant solution.

The outlet passage 11 from tank 10 contains a pump 12 and valve 13 which retains the slurry in the tank until the remaining liquid can be drawn off through decant passages 14, each containing a valve 15. The decant passages also permit water to be added to wash the slurry and then removed. The remaining liquid and water are discharged to any suitable sump (not shown) connected to the lines 14.

The passage 11 conveys the slurry to a water extractor 18 having a cylindrical, outer stationary wall 19. A cylindrical screen 20 is spaced inwardly from wall 19 and is connected by a plate 21 to shaft 22 of motor 23. After a charge of $CuCO_3$ slurry is pumped into the chamber 24 of the extractor, pump 13 is turned off and the precipitate is again washed with water received from pipe 26. The motor 23 is then turned on to spin dry the $CuCO_3$ material which collects on the surface of the screen. The removed liquid passes through screen 20 and leaves through the water passage 25. The wash and spin cycle can be repeated several times to thoroughly clean the material.

Knife 28 is in the raised, dashed line position during the spin drying so that it will not interfere with the material. After the drying cycles are completed, the knife is moved to its full line position adjacent the interior of the screen. An end of conveyor 30 is lowered into compartment 24 adjacent the lower end of knife 28 and the motor 23 is again started. Rotation of the screen relative to the knife removes the dried $CuCO_3$ from the screen and causes it to fall next to conveyor 30 for removal. During the spin drying, motors 23 will run considerably faster than during material removal by knife 28.

Conveyor 30 delivers dried $CuCO_3$ to hopper 31 which feeds into the open end 32 of a rotating reactor 33 which is rotated about its axis by a gear 34 on the opposite end. After the $CuCO_3$ is loaded into the reactor 33, the reactor is slowly rotated and a predetermined amount of water is added to the $CuCO_3$ from passage 36 extending through open end 32. Thereafter 66 Be' sulfuric acid is slowly added to the contents of the reactor by passage 38, resulting in a controlled, violent reaction within the reactor as follows:

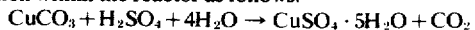

$$CuCO_3 + H_2SO_4 + 4H_2O \rightarrow CuSO_4 \cdot 5H_2O + CO_2$$

The temperature rise in the reactor caused by the heat of reaction is preferably in the range of 220° – 240° F. and the reactor is lined to withstand the reaction temperature. A strong sulfuric acid is required to produce the necessary heat of reaction and the acid cannot be mixed with the water prior to introduction into the reactor. During the reaction, the $CO_2$ gas can be continually withdrawn by a suction line 39 and the anhydrous cupric sulphate $CuSO_4 \cdot 5H_2O$ remains in the reactor in the form of small, snow crystals. The agitation of the mixture continues while cooling and results in the formation of relatively small crystals. After the crystals are formed, air is blown into the mixer to finish drying the crystals. The reactor 33 is constructed similar to a concrete mixer so that rotation in one direction agitates the contents and when its direction of rotation is reversed, the snow crystals of the $CuSO_4 \cdot 5H_2O$ will be discharged from the open end of the reactor into a suitable container 42. Simplified and economical production of copper sulfate from copper carbonate is made possible by the described method. The amount of water and sulfuric acid added to the reactor is very close to the theoretical amount required to form $CuSO_4 \cdot 5H_2O$ so that no substantial amount of mother liquid will remain after the reaction is completed. While the process has been described in connection with the use of spent alkaline etchant, any substance containing copper ions and from which $CuCO_3$ is obtainable, can be used as a source substance.

What is claimed is:

1. The method of producing copper sulfate crystals comprising the steps of:
   1. physically agitating dry copper carbonate;
   2. adding 4 mols of water to every mol of the copper carbonate;
   3. adding slowly essentially 1 mol of concentrated sulfuric acid so that a reaction occurs as
      $$CuCO_3 + H_2SO_4 + 4H_2O \rightarrow CuSO_4 \cdot 5H_2O + CO_2$$
   4. continuously removing by suction the vapors producted by the chemical reaction;
   5. maintaining the temperature of the composition within the approximate range of 220° to 240° F.

6. continuing the agitation of the composition while cooling to effect production of the $CuSO_4 \cdot 5H_2O$ crystals with substantially no mother liquor remaining; and
7. blowing air upon the crystals to completely effect drying of the crystals.

* * * * *